United States Patent
Wang et al.

(10) Patent No.: US 9,152,417 B2
(45) Date of Patent: Oct. 6, 2015

(54) EXPEDITING EXECUTION TIME MEMORY ALIASING CHECKING

(75) Inventors: Cheng Wang, San Ramon, CA (US); Youfeng Wu, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 9 days.

(21) Appl. No.: 13/996,610

(22) PCT Filed: Sep. 27, 2011

(86) PCT No.: PCT/US2011/053548
§ 371 (c)(1),
(2), (4) Date: Jun. 21, 2013

(87) PCT Pub. No.: WO2013/048379
PCT Pub. Date: Apr. 4, 2013

(65) Prior Publication Data
US 2013/0283014 A1 Oct. 24, 2013

(51) Int. Cl.
G06F 9/45 (2006.01)
G06F 9/30 (2006.01)
G06F 9/455 (2006.01)
G06F 9/38 (2006.01)

(52) U.S. Cl.
CPC ............ *G06F 9/30098* (2013.01); *G06F 8/434* (2013.01); *G06F 8/4441* (2013.01); *G06F 9/3834* (2013.01); *G06F 9/45516* (2013.01)

(58) Field of Classification Search
None
See application file for complete search history.

(56) References Cited

U.S. PATENT DOCUMENTS 5,889,999 A * 3/1999 Breternitz et al. ............ 717/158
5,941,983 A    8/1999 Gupta et al.
6,113,650 A    9/2000 Sakai (Continued)

FOREIGN PATENT DOCUMENTS

CN   1355902 A    6/2002
JP   11-039167 A  2/1999

(Continued)

OTHER PUBLICATIONS

International Search Report and Written Opinion mailed May 29, 2012 for International Application No. PCT/US2011/053548, 12 pages.

(Continued)

*Primary Examiner* — Don Wong
*Assistant Examiner* — Daxin Wu
(74) *Attorney, Agent, or Firm* — Schwabe, Williamson & Wyatt, P.C.

(57) ABSTRACT

Embodiments of apparatus, computer-implemented methods, systems, and computer-readable media are described herein for expediting execution time memory alias checking. A sequence of instructions targeted for execution on an execution processor may be received or retrieved. The execution processor may include a plurality of alias registers and circuitry configured to check entries in the alias register for memory aliasing. One or more optimizations may be performed on the received or retrieved sequence of instructions to optimize execution performance of the received or retrieved sequence of instructions. This may include a reorder of a plurality of memory instructions in the received or retrieved sequence of instructions. After the optimization, one or more move instructions may be inserted in the optimized sequence of instructions to move one or more entries among the alias registers during execution, to expedite alias checking at execution time. Other embodiments may be described and/or claimed.

25 Claims, 12 Drawing Sheets

(56) References Cited

U.S. PATENT DOCUMENTS

| | | | |
|---|---|---|---|
| 6,195,676 B1 | 2/2001 | Spix et al. | |
| 6,243,864 B1* | 6/2001 | Odani et al. | 717/154 |
| 6,260,190 B1* | 7/2001 | Ju | 717/156 |
| 6,292,938 B1* | 9/2001 | Sarkar et al. | 717/138 |
| 6,728,954 B1* | 4/2004 | Kesselman et al. | 717/154 |
| 6,832,370 B1 | 12/2004 | Srinivasan et al. | |
| 7,089,404 B1 | 8/2006 | Rozas et al. | |
| 7,117,490 B2* | 10/2006 | Harrison et al. | 717/156 |
| 7,634,635 B1 | 12/2009 | Holscher et al. | |
| 2003/0200540 A1 | 10/2003 | Kumar et al. | |
| 2003/0217356 A1* | 11/2003 | Baraz et al. | 717/158 |
| 2004/0133766 A1 | 7/2004 | Abraham et al. | |
| 2005/0160058 A1* | 7/2005 | Li et al. | 707/1 |
| 2005/0188172 A1* | 8/2005 | Lopez-Estrada | 711/201 |
| 2006/0225061 A1* | 10/2006 | Ludwig et al. | 717/161 |
| 2007/0006167 A1* | 1/2007 | Luk et al. | 717/130 |
| 2007/0006187 A1 | 1/2007 | Murphy et al. | |
| 2008/0288930 A1 | 11/2008 | Chen et al. | |
| 2009/0164762 A1* | 6/2009 | Huang et al. | 712/223 |
| 2010/0058034 A1* | 3/2010 | Zaks | 712/216 |
| 2010/0070958 A1 | 3/2010 | Takagi | |
| 2012/0198428 A1* | 8/2012 | Schmidt | 717/153 |
| 2012/0260072 A1 | 10/2012 | Wang et al. | |

FOREIGN PATENT DOCUMENTS

| | | |
|---|---|---|
| JP | 2010-067234 A | 3/2010 |
| TW | I287195 B | 9/2007 |
| TW | I335517 B | 1/2011 |
| WO | WO 00/77965 A2 | 12/2000 |

OTHER PUBLICATIONS

Edwards, S. A. "Compiling Esterel into Sequential Code" In: Proceedings of the Seventh International Workshop on Hardware/Software Code sign, IEEE, 1999.

Eades, P. "How to draw a directed graph", In: IEEE Workshop on Visual Languages, 1989.

International Preliminary Report on Patentability mailed Apr. 10, 2014 for International Application No. PCT/US2011/053548, 5 pages.

International Search Report and Written Opinion mailed Jul. 30, 2012 for International Application No. PCT/US2011/062470, 9 pages.

Office Action mailed May 15, 2013 for U.S. Appl. No. 13/082,146, 25 pages.

International Preliminary Report on Patentability mailed Oct. 17, 2013 for International Application No. PCT/US2011/062470, 6 pages.

Final Office Action mailed Jan. 9, 2014 for U.S. Appl. No. 13/082,146, 31 pages.

Advisory Action mailed Mar. 24, 2014 for U.S. Appl. No. 13/082,146, 3 pages.

Advisory Action mailed May 20, 2014 for U.S. Appl. No. 13/082,146, 3 pages.

Office Action mailed Oct. 16, 2014 for U.S. Appl. No. 13/082,146, 10 pages.

Office Action mailed May 30, 2014 for Taiwan Application No. 100145055, 17 pages.

Extended European Search Report mailed Feb. 26, 2015 for European Application No. 11872952.4, 11 pages.

Gallagher D M. et al., "Dynamic Memory Disambiguation Using the Memory Conflict Buffer", Principles of Programming Languages, ACM, Nov. 1, 1994, 12 pages, vol. 29, No. 11, New York, NY.

Huang R. et al., "Software-Hardware Cooperative Memory Disambiguation", High-Performance Computer Architecture, 2006. The Twelfth International Symposium, Feb. 11-15, 2006, 10 pages, Piscataway, NJ.

Final Office Action mailed Mar. 19, 2015 for U.S. Appl. No. 13/082,146, 33 pages.

\* cited by examiner

| ORIGINAL SEQUENCE OF INSTRUCTIONS | OPTIMIZED SEQUENCE OF INSTRUCTIONS | MODIFIED OPTIMIZED SEQUENCE OF INSTRUCTIONS | ORD | P | C |
|---|---|---|---|---|---|
| STORE_0 [M0], R0 | LOAD_1 [M1], R1 | LOAD_1 [M1], R1 | 2 | P | |
| LOAD_1 [M1], R1 | STORE_0 [M0], R0 | STORE_0 [M0], R0 | 1 | P | C |
| STORE_2 [M2], R2 | | AMOV @LOAD_1 | | | |
| LOAD_3 [M0], R3 | STORE_2 [M2], R2 | STORE_2 [M2], R2 | 0 | | C |
| | MOV R3←R0 | MOV R3←R0 | | | |

| ORIGINAL SEQUENCE OF INSTRUCTIONS | OPTIMIZED SEQUENCE OF INSTRUCTIONS | MODIFIED OPTIMIZED SEQUENCE OF INSTRUCTIONS | ORD | P | C |
|---|---|---|---|---|---|
| STORE_0 [M0], R0 | LOAD_1 [M1], R1 | LOAD_1 [M1], R1 | 2 | P | |
| LOAD_1 [M1], R1 | STORE_3 [M3], R0 | STORE_3 [M3], R0 | 4 | P | |
| STORE_2 [M2], R2 | STORE_2 [M2], R2 | STORE_2 [M2], R2 | 3 | | C |
| STORE_3 [M3], R3 | | AMOV @STORE_3 4,0 | | | |
| STORE_4 [M0], R4 | STORE_4 [M0], R4 | STORE_4 [M0], R4 | 1 | | C |

EXPEDITING EXECUTION TIME MEMORY ALIASING CHECKING

CROSS REFERENCE TO RELATED APPLICATIONS

The present application is a national phase entry under 35 U.S.C. §371 of International Application No. PCT/US2011/053548, filed Sep. 27, 2011, entitled "EXPEDITING EXECUTION TIME MEMORY ALIASING CHECKING", which designated, among the various States, the United States of America. The Specification of the PCT/US2011/053548 Application is hereby incorporated by reference.

FIELD

Embodiments of the present invention relate generally to the technical field of data processing, and more particularly, to expediting execution time memory aliasing checking.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Computer software may be created in multiple stages. A computer programmer may write human-readable source code (e.g., in C, C++, JAVA® programming language). This source code may then be transformed by a compiler or an interpreter (hereinafter, simply "compiler") into lower-level instructions, such as assembly language instructions and/or machine code instructions, that may be executed by one or more processors (e.g., by a processor core of a multi-core processor).

During compilation or interpretation (hereinafter, simply "compilation"), assembly or machine instructions may be reordered, or "optimized," so that they may be executed more quickly and/or efficiently at runtime. However, it may be difficult to determine whether memory instructions such as load and store will access the same memory location (known as "memory aliasing") at runtime. Accordingly, a compiler or interpreter may optimize instructions as if there will be no memory aliasing among these instructions, while preserving the instructions' original execution order (e.g., using annotations or with additional instructions) in case memory aliasing arises at runtime.

A processor may be equipped with memory disambiguation circuitry to perform speculative memory optimization. At runtime, if the memory disambiguation circuitry detects memory aliasing, it may trigger a memory aliasing exception. Optimized instructions may be stored in an atomic region so that, in the event of a memory aliasing exception, the whole atomic region may be rolled back. Then, original or less-optimized instructions may be executed instead.

Rotation-based memory disambiguation circuitry may detect memory aliasing based on an original execution order of a sequence of instructions. After execution of a memory instruction, the memory address accessed by the instruction may be stored in an alias register queue at a location corresponding to the instruction's location in the original execution order of the sequence of instructions (which as noted above was preserved during compilation). The memory disambiguation circuitry then may compare that memory address with memory addresses accessed by instructions contained in "later" alias register entries (e.g., entries with greater indices) to detect memory aliasing.

Rotation-based memory disambiguation may perform well for instruction scheduling in sequential computer programs. However, it may not perform as well for instruction optimizations in more complex situations. For example, when handling speculative load or store eliminations, memory disambiguation circuitry may unnecessarily alias check memory accessed by instructions that are not actually reordered during optimization. Handling branching programs also may be difficult because there is no original program execution order between memory instructions in different branches, and yet, memory addresses accessed by these instructions may still be assigned to alias registers. With loops, sequential release of alias register entries through iterations (also referred to as "rotations") of the loop may restrict optimization of loop instructions to a sliding window bounded by the size of the alias register queue.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
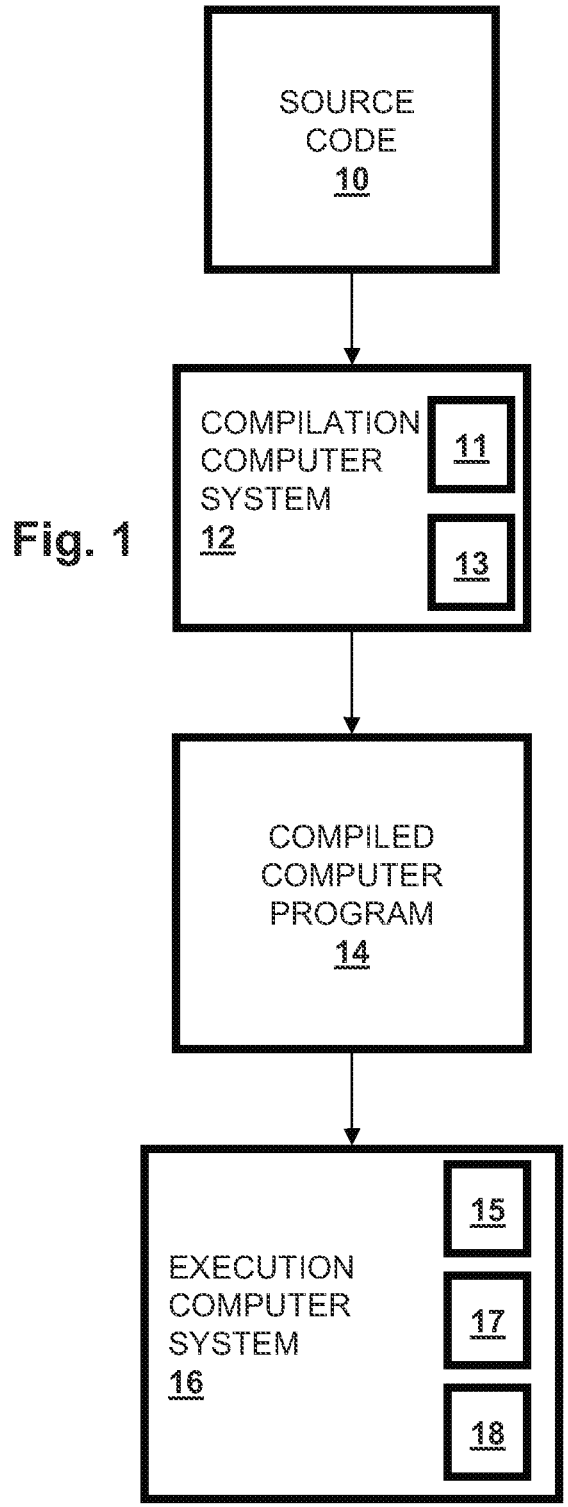
FIG. 1 schematically illustrates an example of how computer programs may be created and optimized/reordered, according to embodiments of the disclosure.

In various embodiments, a computer-implemented method may include receiving or retrieving, by a compiler operated by a compilation processor, a sequence of instructions targeted for execution on an execution processor, wherein the execution processor includes a plurality of alias registers and circuitry configured to check entries in the alias register for memory aliasing. After the receiving or retrieving, the method may further include performing, by the compiler, one or more optimizations on the received or retrieved sequence of instructions to optimize execution performance of the received or retrieved sequence of instructions. Optimization may include reordering a plurality of memory instructions in the received or retrieved sequence of instructions. After the optimization, the method may include inserting, by the compiler, one or more move instructions in the optimized sequence of instructions to move one or more entries among the alias registers during execution, to expedite execution time memory aliasing checking.

In various embodiments, a computer-implemented method may further include, before the inserting, constructing, by the compiler, a graph, with the optimized sequence of instructions represented as nodes of the graph and edges of the graph edges of the graph including checking edges and anti-checking edges. In various embodiments, a checking edge may connect two nodes representing two memory instructions that require execution time memory aliasing checking. In various embodiments, an anti-checking edge may connect two nodes representing two instructions that do not require execution time memory aliasing checking.

In various embodiments, the method further include, before the inserting, detecting, by the compiler, one or more cycles in the graph. In some embodiments, the method may further include inserting into the graph, by the compiler, one or more additional nodes to remove the one or more cycles. The one or more additional nodes may represent the one or more move instructions to be inserted into the optimized sequence of instructions.

In some embodiments, detecting one or more cycles in the graph and inserting into the graph one or more additional nodes representing the one or more move instructions may include: identifying in the graph for a memory instruction B of the optimized sequence of instructions, a set of nodes S reachable from a first node representing B through an incoming edge A→B from a second node A; and inserting into the graph a third node representing a move instruction before the first node representing B, where second node A is found in S.

In some embodiments, detecting one or more cycles in the graph and inserting into the graph one or more additional nodes representing the one or more move instructions include maintaining an order number assignment T(X) for each instruction X. In some embodiments, T(X) may be initialized with the instruction X's relative placement in the sequence of instructions prior to optimization.

In some embodiments, detecting one or more cycles in the graph and inserting into the graph one or more additional nodes representing the one or more move instructions further include:

```
for each instruction B of the optimized sequence of instructions, in an
    execution order of the optimized sequence of instructions:
        denote B as scanned;
        for each incoming edge A → B:
            if T(A) < T(B):
                do nothing;
            else if A has not been scanned:
                set T(A) = T(B) – 1;
            else
                find a set S of all instructions reachable from B
                through incoming edges from instructions that are
                already scanned;
                if A is not in S:
```

-continued

```
            set old_T = T(B);
            set T(B) = T(A) + 1;
            set delta = T(B) – old_T;
            for each instruction C in S:
                T(C) = T(C) + delta.
        if A is in S:
            insert a move instruction ("AMOV")
            before B;
            denote AMOV as scanned
            replace edge A→B with edge AMOV→B
            set T(AMOV) = T(B) – 1;
            set delta = T(A) – T(AMOV);
            for each edge C→A where C is not yet
            scanned:
                replace edge C→A with edge
                C→AMOV
                set T(C) = T(C) – delta;
            for each edge A→C where C is not scanned:
                replace edge A→C with edge
                AMOV→C.
```

In some embodiments, the optimized sequence of instructions may define a loop, and the method may further include inserting into the optimized sequence of instructions, by the compiler, a move instruction to move a memory address of a loop invariant instruction from a first alias register entry to a second alias register entry to ensure that instructions of the optimized sequence contained within the loop will be memory alias checked against the loop invariant instruction. In some embodiments, the method may further include inserting into the optimized sequence of instructions, by the compiler, a rotate instruction to release all alias register entries upon execution of an iteration of the loop.

In some embodiments, the method may further include assigning, by the compiler, a weight to an edge of the graph, wherein the weight assigned to the edge relates to a distance between iterations of the loop that contain instructions represented by the nodes connected by the edge. In some embodiments, inserting into the graph one or more nodes representing the one or more move instructions to remove the one or more cycles includes inserting rotations into the optimized sequence of instructions where a total weight assigned to edges of a detected cycle is positive. In some embodiments, the method may further include using a Floyd-Warshall algorithm to detect a cycle having edges with a negative total weight.

In some embodiments, a processor-implemented method may include executing, by a processor, a memory instruction in an optimized sequence of instructions with reordered memory instructions. This may include inserting a memory address associated with the memory instruction into a first alias register of a plurality of alias registers of the processor to facilitate memory aliasing detection to be performed against the memory address after a later execution of another memory instruction in the optimized sequence of instructions. Later, a move instruction in the optimized sequence of instructions may be executed by the processor to move the memory address inserted into the first alias register to a second alias register of the plurality of alias registers. In some embodiments, the first alias register may be marked as "invalid" so that it will not be alias checked. Still later, one or more other memory instructions in the optimized sequence of instructions may be executed. In some embodiments, the optimized sequence of instructions may be generated by a compiler from an un-optimized sequence of instructions. In some embodiments, the move instruction may be inserted into the optimized sequence of instructions by the compiler to account for implications on execution time memory aliasing checking, by one or more optimizations performed by the compiler on the un-optimized sequence of instructions, to expedite execution time memory aliasing checking, and/or to avoid unnecessary execution alias checking.

In some embodiments, a non-transitory computer-readable medium may be provided having computer-readable code embodied therein, the computer-readable code configured to enable a compiler computer system, in response to execution of the code, to receive or retrieve a sequence of instructions targeted for execution on an execution processor. The execution processor may include a plurality of alias registers and circuitry configured to check entries in the alias register for memory aliasing. The computer-readable code may be further configured to enable a compiler computer system to construct a graph, with the sequence of instructions represented as nodes of the graph and edges of the graph including checking edges and anti-checking edges. The computer-readable code may be further configured to enable a compiler computer system to detect one or more cycles in the graph, as well as insert into the graph one or more additional nodes to remove the one or more cycles. The one or more additional nodes may represent one or more move instructions to be inserted into the sequence of instructions.

In various embodiments, a system may include a processor, a memory, a camera, and an execution module. The execution module may be configured to be operated by the processor to execute a memory instruction in an optimized sequence of instructions with reordered memory instructions. This may include inserting a memory address associated with the memory instruction into a first alias register of an alias register queue to facilitate memory aliasing detection to be performed against the memory address after a later execution of another memory instruction in the optimized sequence of instructions. The execution module may further be configured to execute a move instruction in the optimized sequence of instructions to move the memory address from the first alias register to a second alias register of the alias register queue that is later in the queue than the first alias register. The execution module may further be configured to execute one or more other memory instructions in the optimized sequence of instructions. In some embodiments, the optimized sequence of instructions may be generated by a compiler from an un-optimized sequence of instructions. In some embodiments, the move instruction is inserted into the optimized sequence of instructions by the compiler to account for implications on execution time memory aliasing checking, by one or more optimizations performed by the compiler on the un-optimized sequence of instructions.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality. Further, as alluded to earlier, as used herein, the terms "compiler," "compilation," and other related variants include "interpreter," "interpretation,' and corresponding variants.

FIG. 1 depicts a process by which program source code 10 may be compiled in accordance with various embodiments. Source code 10 may include one or more sequences of instructions written in any number of programming languages, such as C, C++, and so forth. In some embodiments, source code 10 may be assembly language that may be written by a programmer or assembled from source during compilation.

A compilation computer system 12 may be a computer system having one or more compilation processors 11 (e.g., a processor core of a multi-core processor) that operates a compiler 13 to receive or retrieve source code (e.g., source code 10) created by a computer programmer and compile it into machine code. As discussed in the background, during compilation, an original, non-optimized sequence of instructions may be transformed into an optimized sequence of instructions. The output of the compilation computer system 12 therefore may be a compiled computer program 14 that includes an optimized and/or reordered sequence of instructions. In various embodiments, compilation computer system 12 may be a desktop computer, a laptop computer, a smart phone, a tablet computer, a set-top box, a game console and so forth.

The compiled computer program 14 may be received or retrieved by an execution computer system 16. As described in the background, during execution of the compiled computer program 14 by an execution module 15 of the execution computer system 16, which may be operated by one or more processors 17 (e.g., a processor core), the execution computer system 16 may store memory addresses accessed by memory instructions in the optimized sequence of instructions in an alias register queue in accordance with the memory instructions' original execution order. In various embodiments, execution computer system 16 may be a desktop computer, a laptop computer, a smart phone, a tablet computer, a set-top box, a game console and so forth. As illustrated in FIG. 1, execution computer system 16, in embodiments, may include a camera 18, e.g., in the cases of a tablet computer or a smart phone.

Figure 2:
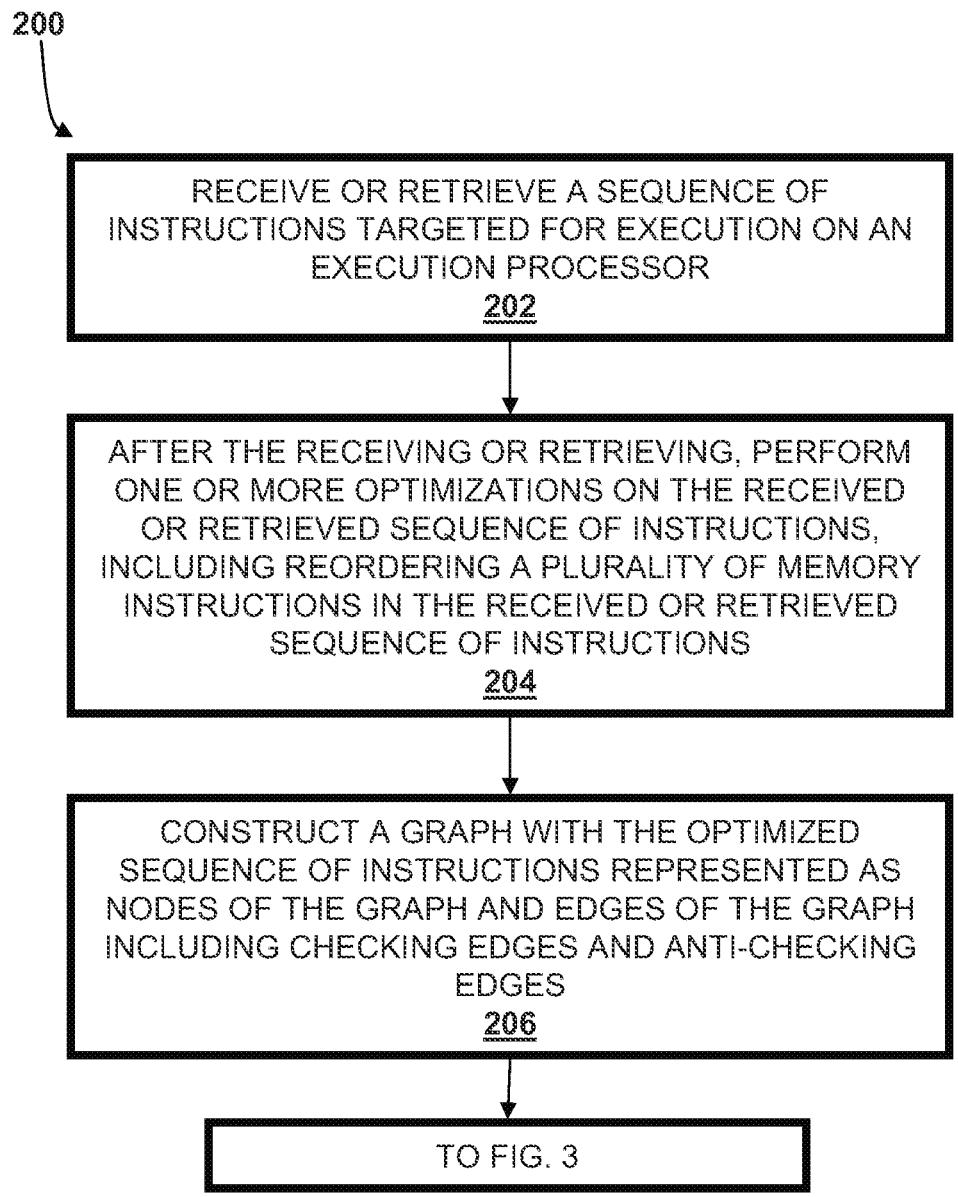
FIGS. 2 and 3 schematically depict an example method that may be executed by a compilation computer system, according to embodiments of the disclosure.
Figure 3:
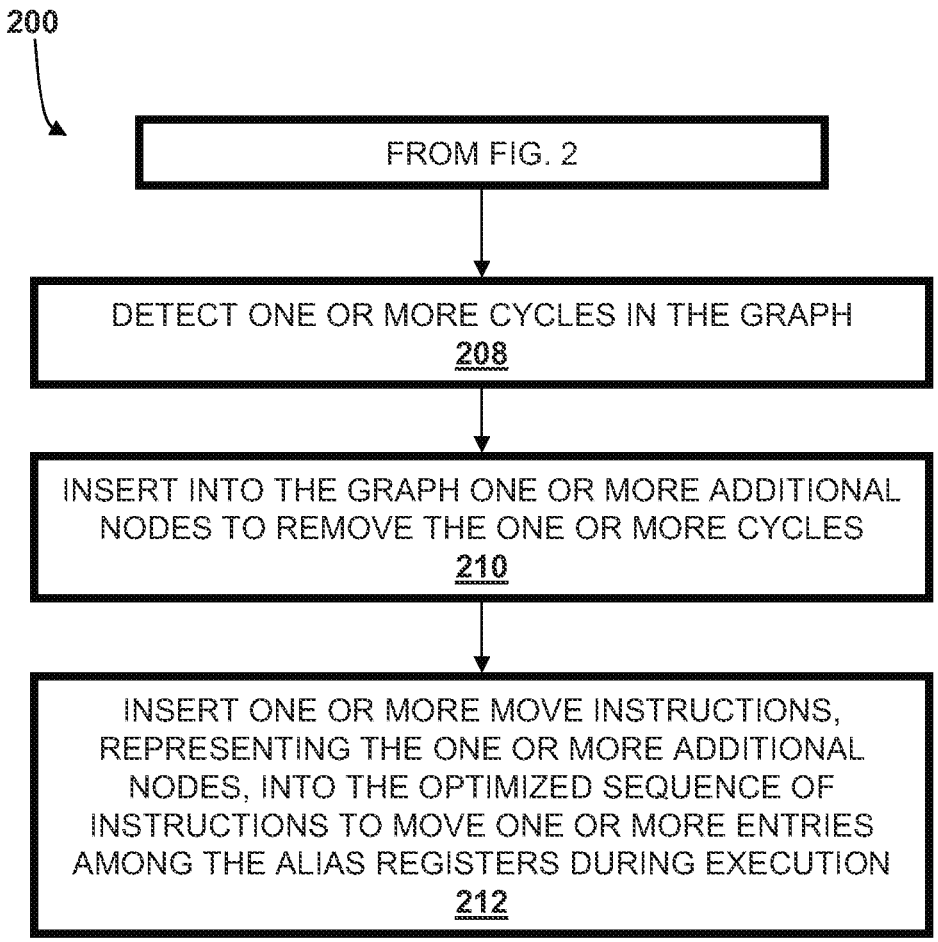

FIGS. 2 and 3 depict an example method 200 that may be performed by a computer system, such as compilation computer system 12, in accordance with various embodiments, as part of compiling source code into an executable computer program. At block 202, the compilation computer system may retrieve or receive a sequence of instructions targeted for execution on one or more execution processors (e.g., on execution computer system 16). For example, a sequence of instructions (e.g., assembly language or machine code) may be produced from source code (e.g., C, C++) during compilation.

At block 204, after receiving or retrieving the sequence of instructions, the compilation computer system may perform one or more optimizations on the received or retrieved sequence of instructions. This may include reordering a plurality of memory instructions (e.g., load, store) in the received or retrieved instructions.

As discussed in the background, memory instructions may be reordered during compilation in spite of a possibility that the reordering will raise memory-aliasing issues. Memory disambiguation circuitry on the execution computer system (e.g., execution computer system 16) may perform alias checking and roll back to the original, un-optimized instructions where a memory alias exception is thrown. However, various unnecessary alias checks may be performed in various situations (e.g., speculative loads and stores, branches, loops), as described in the background.

Accordingly, after the optimization, at blocks 206-212, the compilation computer system may insert one or more move instructions into the optimized sequence of instructions to move one or more entries among the alias registers during execution. This may account for implications on execution time memory aliasing checking by the optimization performed on the received or retrieved sequence of instructions. In some embodiments, this may expedite execution time memory alias checking, e.g., by avoiding unnecessary alias checking at runtime. The move instruction may be implemented in various ways. In various embodiments, an "AMOV" instruction may be used with one or more of an address accessed by a memory instruction, a source alias register and/or a destination alias register as input. It should be understood that a move instruction may be implemented in other ways without departing from the present disclosure.

To determine where in the optimized sequence of instructions to insert a move instruction, at block 206, the compilation computer system 12 may construct a graph with the optimized sequence of instructions represented as nodes of the graph, and edges of the graph including checking edges and anti-checking edges. A checking edge may connect two nodes representing two memory instructions that require execution time memory aliasing checking. For example, the instructions may reference the same memory location and have been reordered during optimization. An anti-checking edge may connect two nodes representing two instructions that do not require execution time memory aliasing checking. For example, the instructions may not reference the same memory location but may be reordered such that the disambiguation hardware may perform memory aliasing anyways.

At block 208, one or more cycles may be detected, e.g., by compilation computer system 12, in the graph. A cycle may indicate that an unnecessary alias check may be performed by memory disambiguation circuitry at runtime. Various algorithms may be used to detect cycles. One example in accordance with various embodiments is discussed below.

At block 210, one or more additional nodes may be inserted into the graph, e.g., by compilation computer system 12, to remove the one or more cycles detected at block 208. These added nodes may represent move instructions that may enable an execution computer system (e.g., 16) to move one or more memory addresses that are accessed by memory instructions among its alias registers during execution of the optimized instructions. At 212, one or more move instructions representing the one or more additional nodes may be added (e.g., by compilation computer system 12) into the optimized sequence of instructions.

Figure 4:
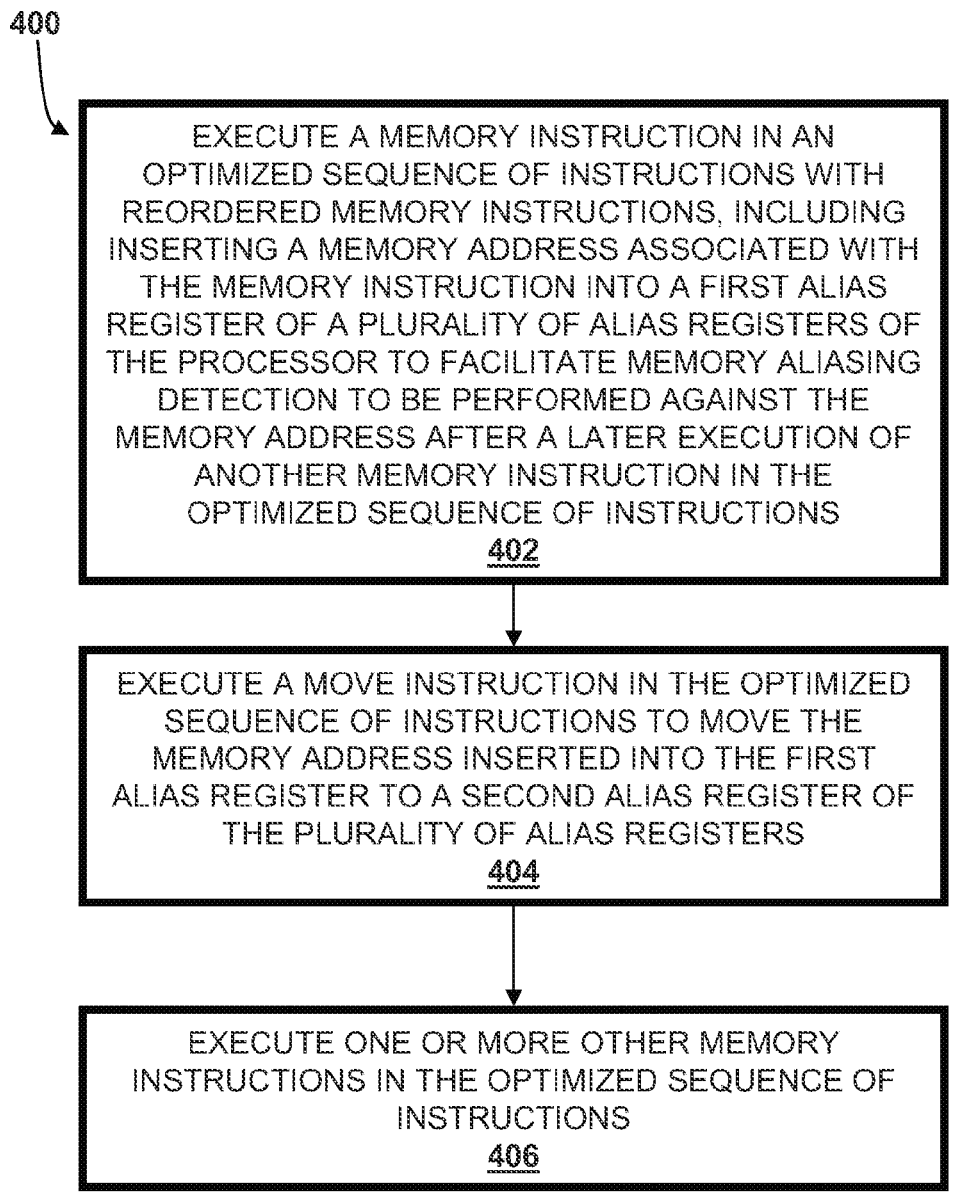
FIG. 4 schematically depicts an example method that may be implemented by an execution computer system, in accordance with embodiments of the disclosure.

A method 400 is shown in FIG. 4 that may be performed at runtime by an execution computer system, such as execution computer system 16, in various embodiments. At block 402, a memory instruction may be executed, e.g., by execution computer system 16, in an optimized sequence of instructions that includes reordered memory instructions. A memory address associated with (e.g., accessed by) the memory instruction may be inserted, e.g., by execution computer system 16, into a first alias register of a plurality of alias registers (in some embodiments referred to as an "alias register queue"). This may facilitate memory aliasing detection to be performed against the memory address after a later execution of another memory instruction in the optimized sequence of instructions.

At block 404, a move instruction in the optimized sequence of instructions may be executed, e.g., by execution computer system 16, to move the memory address accessed by the memory instruction from the first alias register to a second alias register of the plurality of alias registers. In some embodiments, the first alias register may be set to "invalid." This may prevent an alias check from being performed against memory accessed by the first memory instruction (e.g., where it is not necessary). At block 406, one or more other memory instructions in the optimized sequence of instructions may be executed, e.g., by execution computer system 16.

A compiler, e.g., compiler 13 executing on compilation computer system 12, may determine where to insert move instructions in various ways. In some embodiments, the compilation computer system may be enabled to perform the following operations on a graph constructed as described above, with an optimized sequence of instructions represented as nodes of the graph, and edges of the graph including checking edges and anti-checking edges:

--- initialize an order number assignment T(X) for each instruction X of an
    optimized sequence of instructions with the instruction X's relative
    placement in the sequence of instructions prior to optimization;
for each instruction B of the optimized sequence of instructions, in an
    execution order of the optimized sequence of instructions:
    denote B as scanned;
    for each incoming edge A → B:
        if T(A) < T(B):
            do nothing;
        else if A has not been scanned:
            set T(A) = T(B) − 1;
        else
            find a set S of all instructions reachable from B
            through incoming edges from instructions that are
            already scanned;
            if A is not in S:
                set old_T = T(B);
                set T(B) = T(A) + 1;
                set delta = T(B) − old_T;
                for each instruction C in S:
                      T(C) = T(C) + delta.
            if A is in S:
                insert a move instruction ("AMOV") before B;
                denote AMOV as scanned
                replace edge A→B with edge AMOV→B
                set T(AMOV) = T(B) − 1;
                set delta = T(A) − T(AMOV);
                for each edge C→A where C is not yet
                scanned:
                    replace edge C→A with edge
                    C→AMOV
                    set T(C) = T(C) − delta;
                for each edge A→C where C is not scanned:
                    replace edge A→C with edge
                    AMOV→C.

---

In some embodiments, the above algorithm may be extended to handle checking and anti-checking edges across loop back edges. A compiler may assign weights to edges of a graph representing a sequence of instructions. The weight assigned to an edge may relate to a distance between iterations of the loop that contain instructions represented by the nodes connected by the edge. For example, each checking and anti-checking edge may be assigned a weight, d. d may indicate that a checking or anti-checking edge connects nodes representing instructions in iterations i and i+d of the loop. Checking edges may be from a later executed instruction to an earlier executed instruction, and anti-checking edges may be the opposite. Thus, d for checking edges may always be negative, and d for anti-checking edges may be positive. If d for an edge is zero, then the two nodes connected by the edge may be in the same loop iteration.

The compiler may use various algorithms to measure weights of cycles. For example, the compiler may implement the Floyd-Warshall algorithm to detect a cycle having edges with a negative total weight. When a total weight assigned to edges of a detected cycle is positive, the compiler may insert rotations into the optimized sequence of instructions to avoid unnecessary alias checking.

Figures 5, 6:
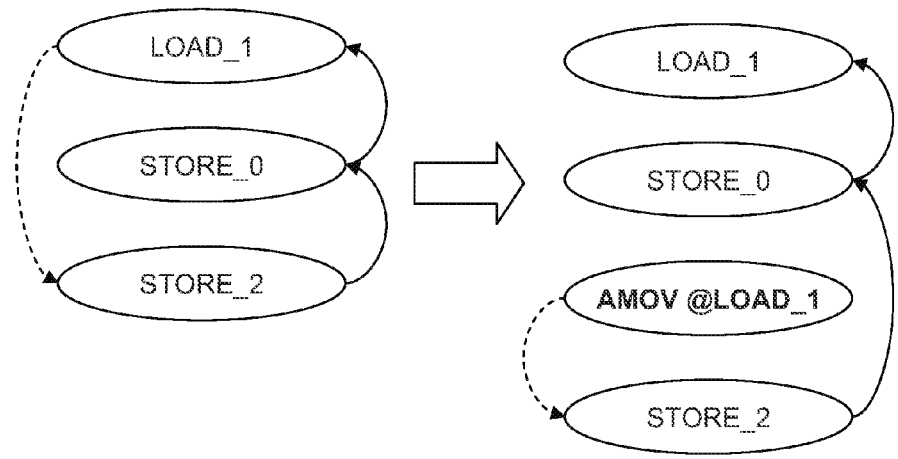
FIGS. 5 and 6 schematically depict an example of how disclosed methods may be performed on instructions containing a speculative load, in accordance with embodiments of the disclosure.

An example of how these operations may be performed on a speculative load is shown in FIGS. 5 and 6, in accordance with various embodiments. In FIG. 5, the original sequence of instructions is shown in the left column and the optimized sequence of instructions is shown in the next column to the right. The "ORD" column in FIG. 5 shows the alias register entries to which memory addresses accessed by the optimized instructions may be assigned to the instructions for alias checking at runtime. The "P" (protect) column may indicate which instructions need to have memory addresses they access inserted into an alias register. The "C" (check) column may indicate which instructions access memory that may need to be alias checked against the entries in the alias registers.

STORE_0 and LOAD_3 access the same memory location, [m0], and so the instructions may be optimized so that data is forwarded from STORE_0 TO LOAD_3 and LOAD_3 is eliminated. However, this may be done under the assumption that there is no memory aliasing between STORE_2 and STORE_0. To account for the elimination of LOAD_3, memory accessed by STORE_2 may need to be alias checked against memory accessed by STORE_0, even though they are not reordered during optimization.

As noted above, with rotation-based memory disambiguation circuitry, memory addresses in an alias register queue may be alias checked against "later" alias registers (e.g., those that are later in an alias register queue). Accordingly, the memory address accessed by STORE_2 may be inserted in the alias register queue at a location that is "earlier" than a location to which memory accessed by STORE_0 is assigned.

Additionally, due to the reorder of LOAD_1 and STORE_0, memory accessed by STORE_0 may be alias checked against memory accessed by LOAD_1. A memory address accessed by STORE_0 may be inserted in the alias register queue at a location that is "earlier" than a location to which a memory address accessed by LOAD_1 is inserted. Transitively, a memory address accessed by STORE_2 may be inserted into an "earlier" alias register queue entry than a memory address accessed by LOAD_1. This may result in memory accessed by STORE_2 being alias checked against memory accessed by LOAD_1, which may be unnecessary. Such unnecessary alias checks may cause alias exceptions to be thrown, resulting in rollbacks to un-optimized instructions and negative impact on performance. Accordingly, the optimized sequence of instructions of FIG. 5 may be modified to include a move instruction to expedite execution time memory aliasing checking by avoiding unnecessary alias checking.

As shown on the left side of FIG. 6, a graph may be constructed, e.g., by compilation computer system 12 at block 206, with nodes representing the optimized instructions of FIG. 5. Solid edges may represent checking edges and dashed edges may represent anti-checking edges. This graph tracks the memory aliasing problem mentioned above. The checking edge STORE_0→LOAD_1 indicates that memory accessed by STORE_0 should be assigned to an "earlier" alias register entry than memory accessed by LOAD_1. Likewise, the checking edge STORE_2→STORE_0 indicates that memory accessed by STORE_2 should be assigned to an "earlier" alias register than memory accessed by STORE_0. The anti-checking edge LOAD_1→STORE_2 indicates that memory accessed by STORE_2 should not be assigned to an "earlier" alias register than memory accessed by LOAD_1. These three edges and the nodes they connect combine to yield a cycle, which indicates an unnecessary alias check. Once detected, this cycle may be broken by inserting one or more instructions at compile time so that at runtime, unnecessary alias checks are avoided.

Using the algorithm above T(STORE_0) may be initialized to 0, T(LOAD_1) may be initialized to 1, and T(STORE_2) may be initialized to 2, to represent their original execution order. The instructions may be scanned in optimized execution order. Nothing happens when scanning LOAD_1 because T(LOAD_1)>T(STORE_0). When scanning STORE_0, incoming checking edge STORE_2→STORE_0 may be identified. However, T(STORE_2)≥T(STORE_0). STORE_2 has not been scanned yet, and so T(STORE_2) may be set to −1.

When scanning STORE_2, incoming anti-checking edge LOAD_1→STORE_2 may be identified. Because T(LOAD_1)≥T(STORE_2), a set of nodes, reachable from STORE_2 through incoming edges from already-scanned instructions, may be set to S={STORE_2, STORE_0, LOAD_1}. Because LOAD_1 is in S, a move instruction node "AMOV @LOAD_1" may be inserted before STORE_2, as shown in the graph on the right-hand side of FIG. 6.

In addition to inserting the move instruction node, the anti-checking edge LOAD_1→STORE_2 may be replaced with AMOV @LOAD_1→STORE_2. T(AMOV @LOAD_1) may be set to −2. The resulting graph on the right-hand side of FIG. 6 contains no cycles. The modified optimized sequence of instructions in FIG. 5 shows that an AMOV @LOAD_1 instruction has been inserted after STORE_0 and before STORE_2. This instruction may cause the execution computer system, such as execution computer system 16, to move a memory address accessed by LOAD_1 to a different alias register (e.g., at entry 0 of an alias register queue), so that a memory address accessed by STORE_2 is not alias checked against it.

Figures 7, 8:
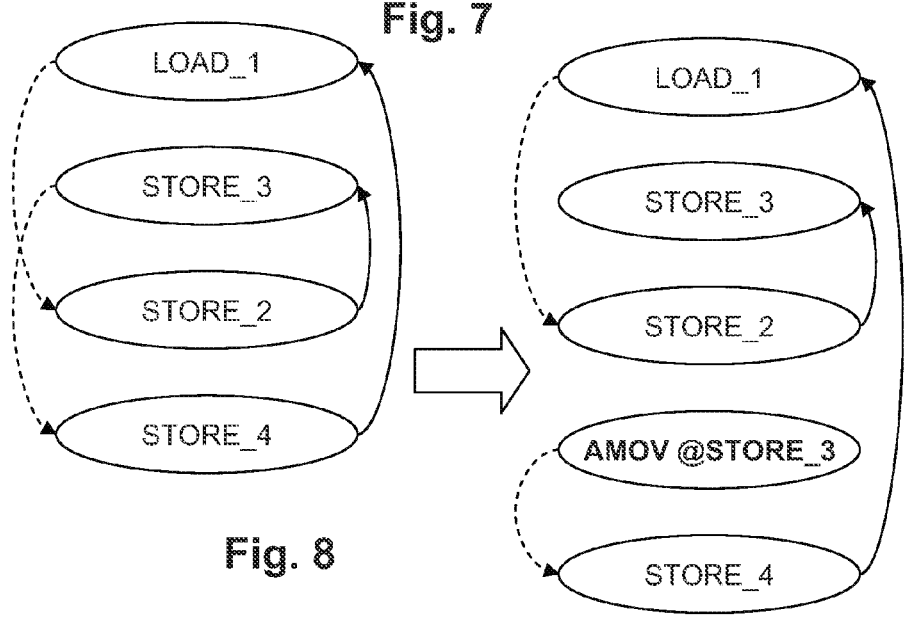
FIGS. 7 and 8 schematically depict an example of how disclosed methods may be performed on instructions containing a speculative store, in accordance with embodiments of the disclosure.

FIGS. 7 and 8 illustrate an example of how disclosed methods and operations may be used in a speculative store-elimination situation, in accordance with various embodiments. STORE_4 accesses the same memory, [m0], as STORE_0, without there being any load instructions involving the same memory in between the two instructions, and so STORE_0 may be deleted. In order for the optimization to be correct, memory accessed by STORE_4 may be alias checked against memory accessed by LOAD_1, even though they are not reordered. At the same time, due to the reordering of STORE_2 and STORE_3, STORE_2 may be alias checked against memory accessed by STORE_3.

Thus, memory accessed by STORE_4 may need an alias register entry earlier than memory accessed by LOAD_1, and memory accessed by STORE_2 may need an alias register entry earlier than memory accessed by STORE_3. If memory accessed by LOAD_1 is assigned to an alias register entry earlier than memory accessed by STORE_3, then memory accessed by STORE_4 may also be aliased checked unnecessarily against memory accessed by STORE_3. On the other hand, if memory accessed by STORE_3 is assigned to an alias register entry that is earlier than that memory accessed by LOAD_1, then memory accessed by STORE_2 may be alias checked unnecessarily against memory accessed by LOAD_1. Either way, unnecessary alias checking may be performed. Accordingly, the optimized sequence of instructions of FIG. 7 may be modified to include a move instruction.

FIG. 8 depicts, on the left-hand side, a graph constructed from the optimized sequence of instructions shown in FIG. 7. Using an algorithm such as that described above, a cycle may be detected in the graph. An AMOV @STORE_3, 4, 0 instruction may be inserted between the STORE_2 and STORE_4 nodes. The corresponding move instruction that is inserted into the optimized sequence of instructions may cause an execution computer system (e.g., 16) to move the address of memory accessed by STORE_3 from a fourth entry in an alias register queue to a first entry. The anti-checking edge STORE_3→STORE_4 may be replaced by an anti-checking edge AMOV @STORE_3, 4, 0→STORE_4. The result, without cycles, is shown on the right-hand side of FIG. 8. Using this resulting graph, the AMOV @STORE_3 instruction may be inserted into the optimized sequence of FIG. 7 to yield the modified optimized sequence of instructions shown in FIG. 7.

Figure 9:
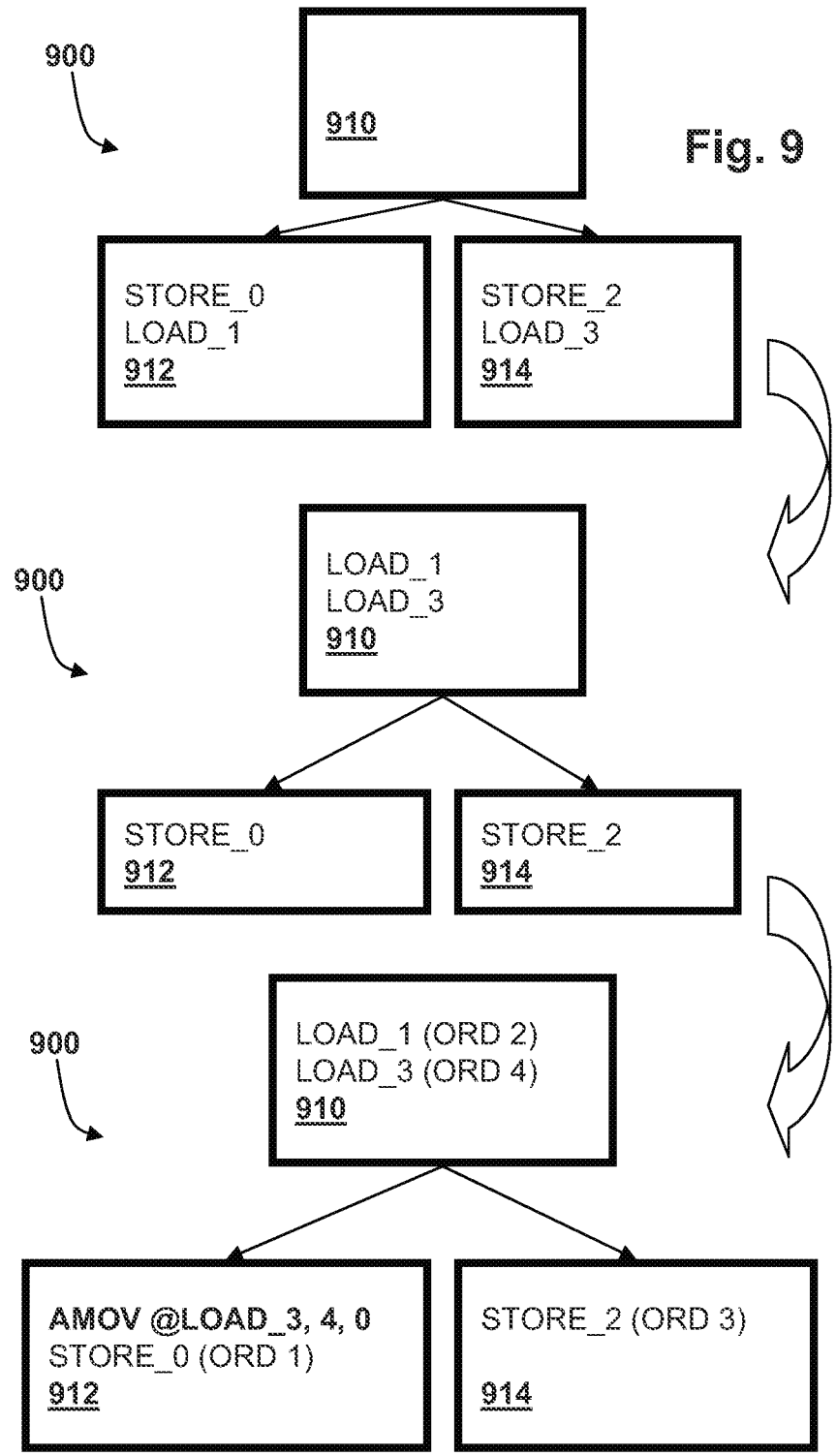
FIGS. 9 and 10 schematically depict an example of how disclosed methods may be used on branched memory instructions, in accordance with embodiments of the disclosure.

FIG. 9 depicts an example of how disclosed methods and operations may be used with a branched sequence of instructions, in accordance with various embodiments. At the top, a graphical representation 900 of an original sequence of instructions is shown. A root node 910 and two branch nodes, 912 and 914, may represent a sequence of instructions including STORE_0 and LOAD_1 in the first branch 912 and STORE_2 and LOAD_3 in the second branch 914.

During compilation (e.g., by compilation computer system 12), these instructions may be optimized as shown in the middle graph of FIG. 9. The LOAD_1 and LOAD_3 instructions may be moved to the root node 910, and the STORE_0 and STORE_2 instructions may remain in the branch nodes 912 and 914, respectively.

Once optimized, memory accessed by STORE_0 may need to be alias checked against memory accessed by LOAD_1, and memory accessed by STORE_2 may need to be alias checked against memory accessed by LOAD_3. Since there is no original execution order between LOAD_1 and LOAD_3, assigning alias register entries to memory accessed by the optimized instructions may result in unnecessary alias checking. If memory accessed by LOAD_1 is assigned to an alias register entry earlier than memory accessed by LOAD_3, memory accessed by STORE_0 may also be alias checked, unnecessarily, against memory accessed by LOAD_3. Likewise, if memory accessed by LOAD_3 is assigned to an alias register entry earlier than memory accessed by LOAD_1, memory accessed by STORE_2 may also be alias checked, unnecessarily, against memory accessed by LOAD_1.

Figure 10:
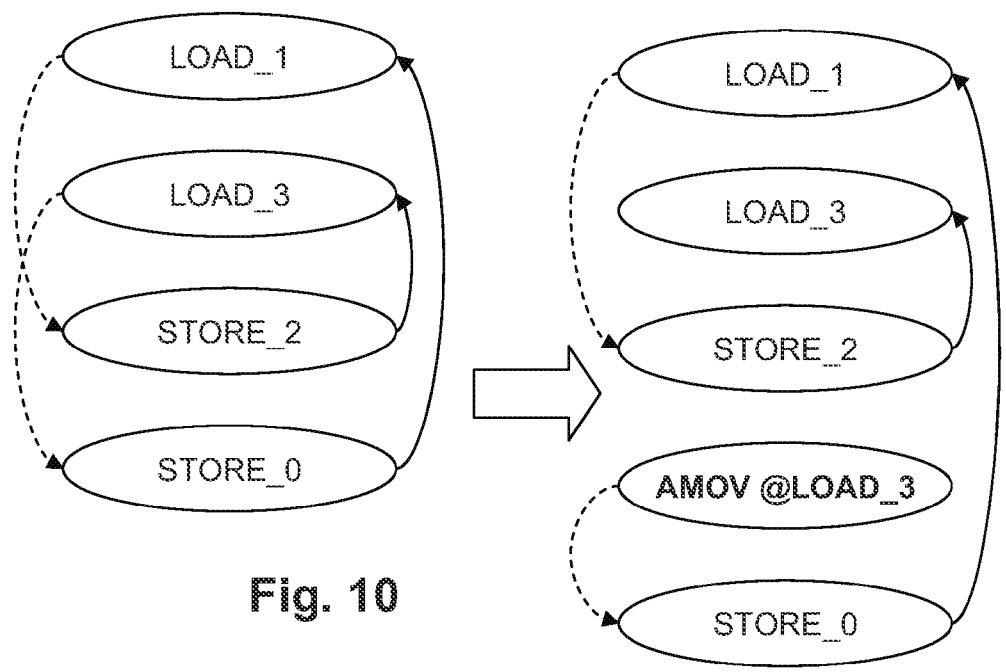

A graph representing the optimized branched sequence of instructions is shown on the left-hand side of FIG. 10. There may not be anti-checking edge between LOAD_2 and LOAD_4 because, in some embodiments, memory accessed by loads may not need to be alias checked against memory accessed by other loads. There also may not need to be edges between STORE_1 and STORE_3 because they execute in different branches. As shown, this graph includes a cycle.

The optimized sequence of instructions of FIG. 9 may be modified to include a move instruction. An example resulting graph is shown on the right-hand side of FIG. 10, in accordance with various embodiments. An example resulting sequence of instructions is shown at the bottom of FIG. 9 with ORD annotations, in accordance with various embodiments. An AMOV @LOAD_3 instruction may be inserted before STORE_0. The AMOV instruction may cause an execution computer system (e.g., execution computer system 16) to move a memory address accessed by LOAD_3 from one alias register entry (e.g., entry 4 of an alias register queue) to another, earlier alias register (e.g., entry 0 of the alias register queue). Thus, when STORE_0 in the first branch node 912 is executed, memory it accesses may only be alias checked against memory accessed by LOAD_1, without being alias checked against memory accessed by LOAD_3. Memory accessed by STORE_2 may only be alias checked against memory accessed by LOAD_3 because it has an ORD number that is greater than LOAD_1.

Figure 11:
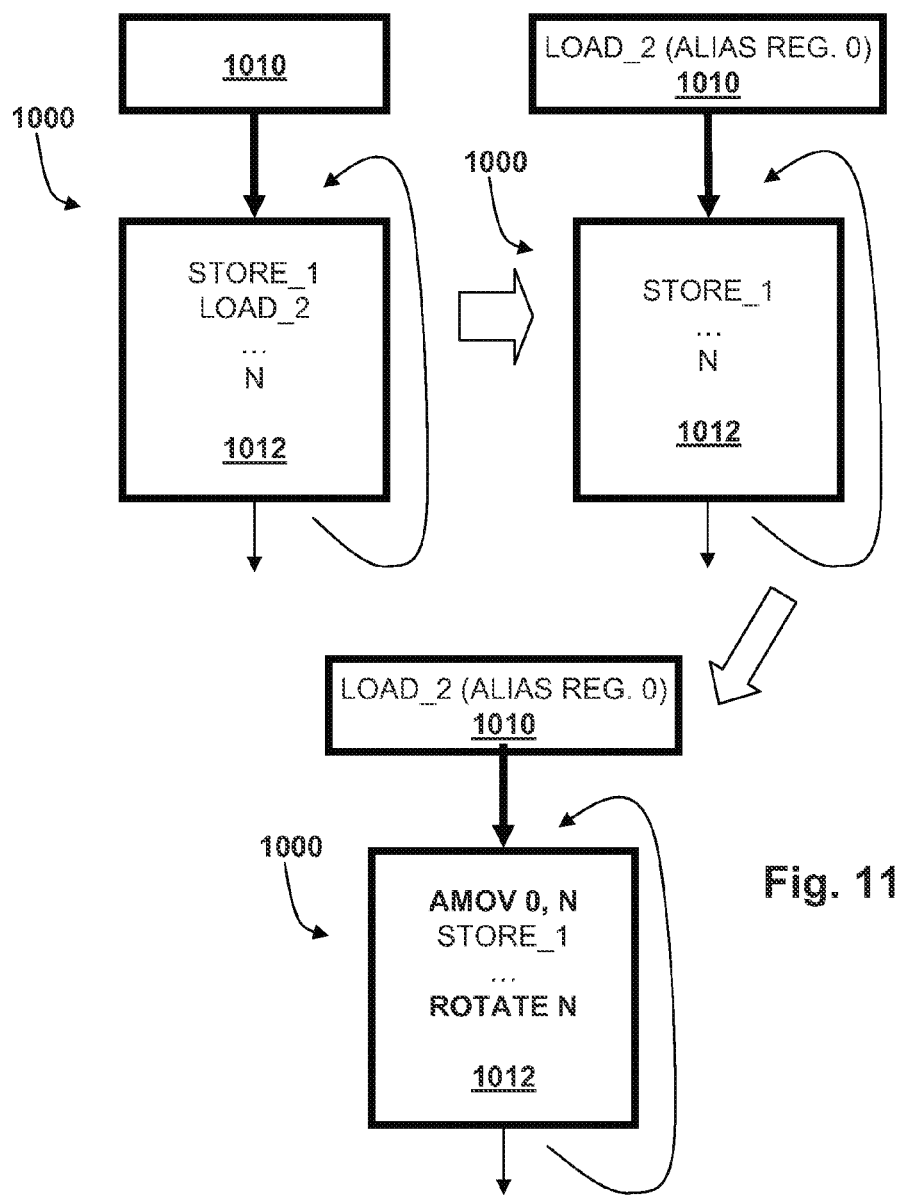
FIGS. 11-13 schematically depict an example of how disclosed methods may be used on memory instructions in a loop, in accordance with embodiments of the disclosure.
Figure 12:
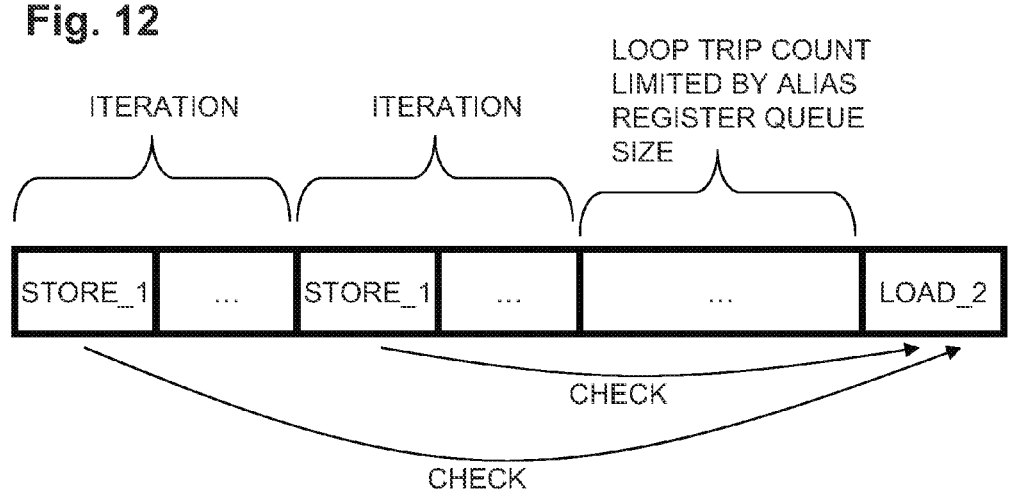
Figure 13:
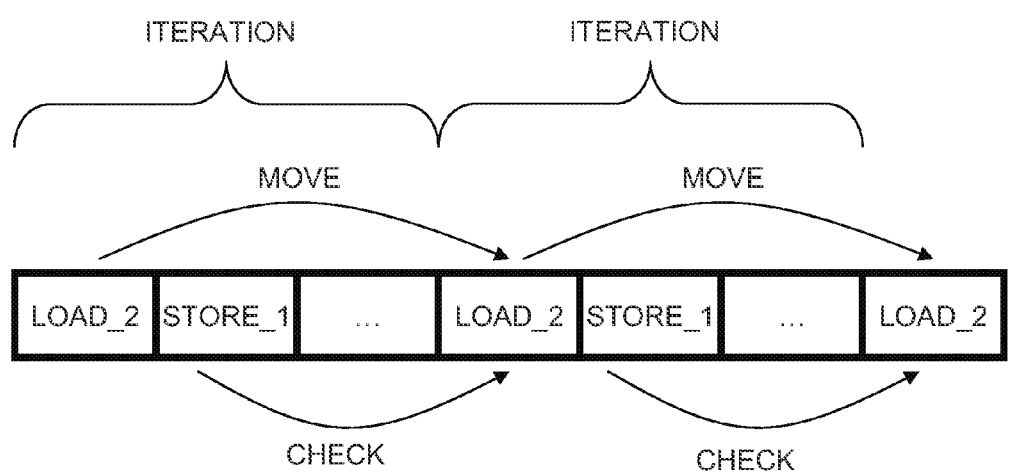

FIGS. 11-13 depict an example of how disclosed methods and operations may be used for loop invariant hoisting optimizations, in accordance with various embodiments. At the top left of FIG. 11, a graphical representation 1000 of the original sequence of instructions is shown. Pre-loop instructions are represented by the pre-loop node 1010. Instructions within the loop, including STORE_1, LOAD_2 . . . N, are represented by the loop node 1012.

The original sequence of instructions may be optimized, e.g., by compilation computer system 12, and an example result is shown at the top right of FIG. 11, in accordance with various embodiments. LOAD_2, known as a "loop invariant" instruction because it is not affected by operations within the loop, has been moved outside of the loop (in what may be referred to as "hoisting") into the pre-loop instructions in node 1010. The remaining loop instructions, STORE_1, . . . N, remain inside the loop, as indicated in node 1012.

FIG. 12 schematically depicts an example alias register queue as it may be populated during execution of the optimized sequence of instructions shown at the top right of FIG. 11, in accordance with various embodiments. Memory accessed by LOAD_2 may be assigned to a first or last alias register of the alias register queue, so that, within each loop iteration, memory accessed by STORE_1 may be alias checked against memory accessed by LOAD_2. Rotation-based memory disambiguation may provide for rotation and release of alias register entries for reuse during loop execution. However, the alias register entry used for memory accessed by LOAD_2 may not be released until the end of the loop. Thus, the number of times the loop can iterate (referred to as the "trip count" in the drawings) may be restricted by the size of the alias register queue.

Accordingly, a move instruction may be inserted at the beginning of the loop so that, at the beginning of each iteration of the loop, the memory address accessed by LOAD_2 may be moved to the an N'th entry of the alias register queue (assuming N−1 alias registers are used inside the loop body). An example result is shown in the bottom of FIG. 11, and an example alias register queue is shown in FIG. 13, in accordance with various embodiments.

Alias register entries may be assigned to instructions within the loop body, without consideration for alias checking against loop invariant loads. At the beginning of the loop body, an AMOV 0, N instruction may be inserted to cause an execution computer system (e.g., execution computer system 16) to move a memory address accessed by a loop invariant load, e.g., LOAD_2, to be later than the alias register entries assigned to memory accessed by instructions, e.g., STORE_2, within the loop body. Thereafter, memory accessed by each iteration of STORE_2 may be alias checked against memory accessed by the hoisted invariant load, LOAD_2. A rotation instruction (ROTATE N) may be inserted at the end of the loop body which may cause the execution computer system (e.g., 16) to release alias register entries from 0 to (N−1). As a result, during execution, at the end of each iteration of the loop, the alias register entries used in the loop body, including alias register entries used for memory accessed by loop invariant loads such as LOAD_2, may be released by the execution computer system.

Figure 14:
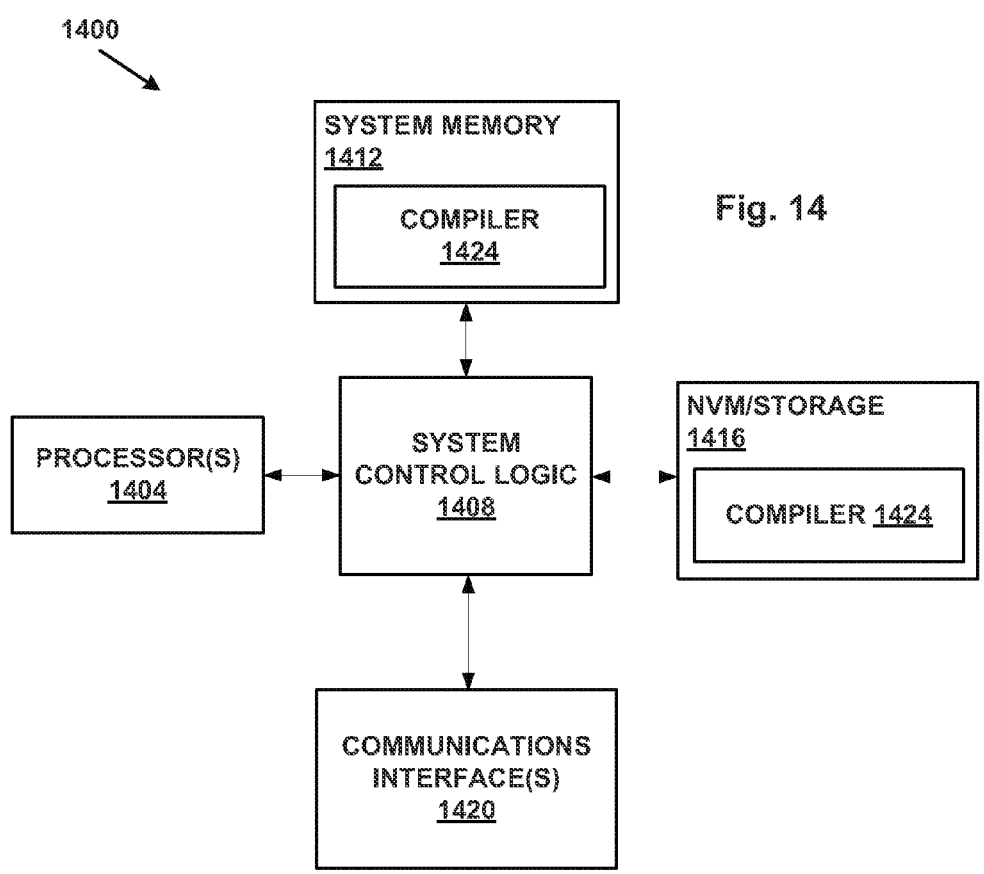
FIG. 14 schematically depicts an example system on which various methods and compilers may be implemented, in accordance with various embodiments.

The techniques and apparatuses described herein related to compiler instructions may be implemented into systems using suitable hardware and/or software to configure as desired. FIG. 14 illustrates, for various embodiments, an example system 1400 comprising one or more processor(s) 1404 (e.g., a processor core), system control logic 1408 coupled to at least one of the processor(s) 1404, system memory 1412 coupled to system control logic 1408, non-volatile memory ("NVM")/storage 1416 coupled to system control logic 1408, and one or more communications interface(s) 1420 coupled to system control logic 1408.

System control logic 1408 for one embodiment may include any suitable interface controllers to provide for any suitable interface to at least one of the processor(s) 1404 and/or to any suitable device or component in communication with system control logic 1408.

System control logic 1408 for one embodiment may include one or more memory controller(s) to provide an interface to system memory 1412. System memory 1412 may be used to load and store data and/or instructions, for example, for system 1400. System memory 1412 for one embodiment may include any suitable volatile memory, such as suitable dynamic random access memory ("DRAM"), for example.

System control logic 1408 for one embodiment may include one or more input/output ("I/O") controller(s) to provide an interface to NVM/storage 1416 and communications interface(s) 1420.

NVM/storage 1416 may be used to store data and/or instructions, for example. NVM/storage 1416 may include any suitable non-volatile memory, such as flash memory, for example, and/or may include any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s), for example.

The NVM/storage 1416 may include a storage resource physically part of a device on which the system 1400 is installed or it may be accessible by, but not necessarily a part of, the device. For example, the NVM/storage 1416 may be accessed over a network via the communications interface(s) 1420.

Communications interface(s) 1420 may provide an interface for system 1400 to communicate over one or more networks and/or with any other suitable device. Communications interface(s) 1420 may include any suitable hardware and/or firmware.

System memory 1412 and NVM/storage 1416 may include temporal and persistent copies of a compiler 1424, respectively. The compiler 1424 may include instructions that when executed by at least one of the processor(s) 1404 result in the system 1400 optimizing and/or reordering sequences of instructions, as well as inserting move instructions to account for implications of the optimization or reordering. In some embodiments, the compiler 1424 may additionally/alternatively be located in the system control logic 1408.

For one embodiment, at least one of the processor(s) 1404 may be packaged together with logic for one or more controller(s) of system control logic 1408. For one embodiment, at least one of the processor(s) 1404 may be packaged together with logic for one or more controllers of system control logic 1408 to form a System in Package ("SiP"). For one embodiment, at least one of the processor(s) 1404 may be integrated on the same die with logic for one or more controller(s) of system control logic 1408. For one embodiment, at least one of the processor(s) 1404 may be integrated on the same die with logic for one or more controller(s) of system control logic 1408 to form a System on Chip ("SoC").

The system 1400 may be a desktop or laptop computer, a mobile telephone, a smart phone, a tablet, a set-top box, a game console, or any other device adapted to compile a computer program. In various embodiments, system 1400 may have more or less components, and/or different architectures.

Figure 15:
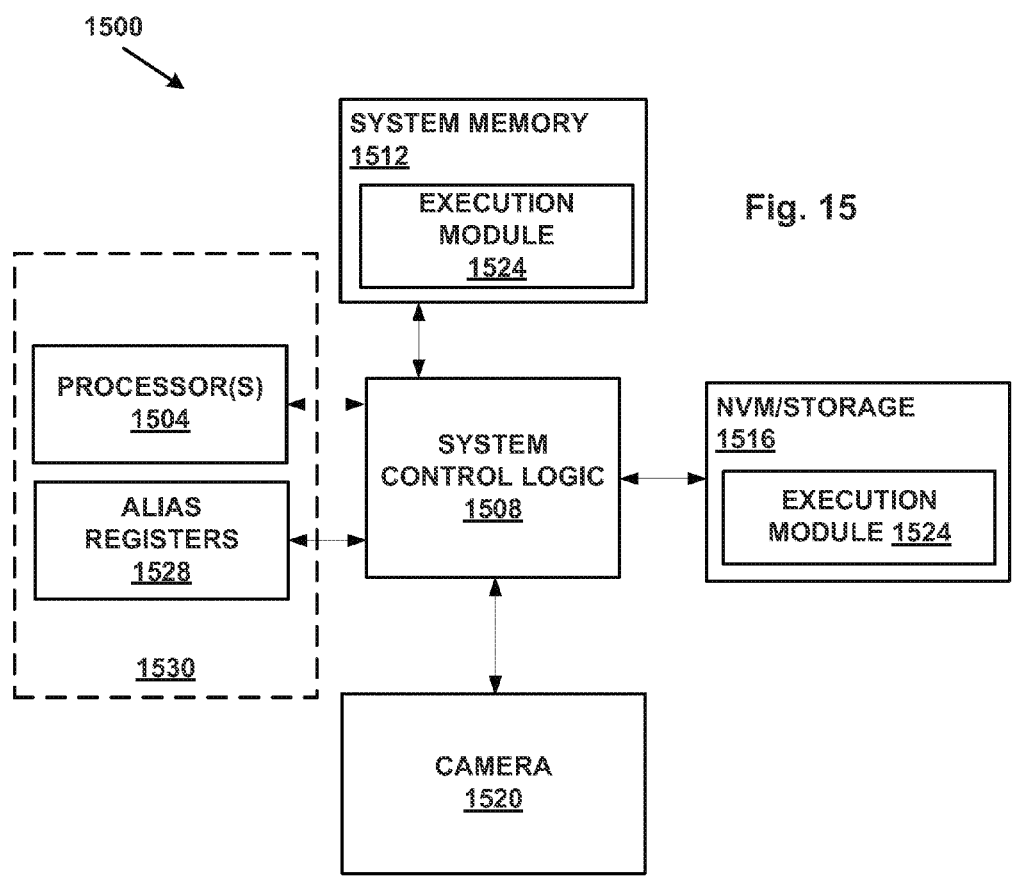
FIG. 15 schematically depicts an example system on which various methods and execution modules may be implemented, in accordance with various embodiments.

The techniques and apparatuses described herein related to memory disambiguation and execution of computer programs (e.g., including optimized instructions) may be implemented into systems using suitable hardware and/or software to configure, similar to system 1400. FIG. 15 illustrates, for various embodiments, an example system 1500 comprising one or more processor(s) 1504 (e.g., a processor core), system control logic 1508 coupled to at least one of the processor(s) 1504, system memory 1512 coupled to system control logic 1508, NVM/storage 1516 coupled to system control logic 1508, one or more camera(s) 1520 coupled to system control logic 1508, and a plurality of alias registers 1528 coupled to system control logic 1508. In various embodiments, the alias registers 1528 may be registers on the one or more processors 1504. In other embodiments, the alias registers 1528 may be in system memory 1512.

In various embodiments, a sequence of instructions may be part of an application associated with operation of the camera 1520 or usage of data associated with the camera. For example, the application may be used to exchange photographs over a network or to perform video conferencing.

System control logic 1508 for some embodiments may include any suitable interface controllers to provide for any suitable interface to at least one of the processor(s) 1504 and/or to any suitable device or component in communication with system control logic 1508.

System control logic 1508 for one embodiment may include one or more memory controller(s) to provide an interface to system memory 1512. System memory 1512 may be used to load and store data and/or instructions, for example, for system 1500. System memory 1512 for one embodiment may include any suitable volatile memory, such as DRAM, for example.

System control logic 1508 for one embodiment may include one or more I/O controller(s) to provide an interface to NVM/storage 1516.

NVM/storage 1516 may be used to store data and/or instructions, for example. NVM/storage 1516 may include any suitable non-volatile memory, such as flash memory, for example, and/or may include any suitable non-volatile storage device(s), such as one or more HDD(s), one or more solid-state drive(s), one or more CD drive(s), and/or one or more DVD drive(s), for example.

The NVM/storage 1516 may include a storage resource physically part of a device on which the system 1500 is installed or it may be accessible by, but not necessarily a part of, the device. For example, the NVM/storage 1516 may be accessed over a network.

System memory 1512 and NVM/storage 1516 may include temporal and persistent copies of an execution module 1524, respectively. The execution module 1524 may include instructions that when executed by at least one of the processor(s) 1504 result in the system 1500 executing sequences of instructions produced by, for instance, compilation computer system 12. In some embodiments, the execution module 1524 may additionally/alternatively be located in the system control logic 1508.

In some embodiments, the one or more processors 1504 and the alias registers 1528 may together form memory disambiguation circuitry 1530. In some embodiments, separate circuitry (not shown) may be provided to perform memory disambiguation.

For one embodiment, at least one of the processor(s) 1504 may be packaged together with logic for one or more controller(s) of system control logic 1508. For one embodiment, at least one of the processor(s) 1504 may be packaged together with logic for one or more controllers of system control logic 1508 to form an SiP. For one embodiment, at least one of the processor(s) 1504 may be integrated on the same die with logic for one or more controller(s) of system control logic 1508. For one embodiment, at least one of the processor(s) 1504 may be integrated on the same die with logic for one or more controller(s) of system control logic 1508 to form an SoC.

The system 1500 may be a desktop or laptop computer, a mobile telephone, a smart phone, a tablet, a set-top box, a game console or any other device adapted to execute a computer program. In various embodiments, system 1500 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A non-transitory computer-readable medium having computer-readable code embodied therein, the computer-readable code to cause a computer system, in response to execution of the computer-readable code, to:

receive or retrieve a sequence of instructions targeted for execution on an execution processor, wherein the execution processor includes a plurality of alias registers and circuitry to check entries in an alias register for memory aliasing;

after the sequence of instructions is received or retrieved, perform one or more optimizations on the received or retrieved sequence of instructions to optimize execution performance of the received or retrieved sequence of instructions, the one or more optimizations including a reorder of a plurality of memory instructions in the received or retrieved sequence of instructions; and after the one or more optimizations, construct a graph, with the optimized sequence of instructions represented as nodes of the graph and edges of the graph; and insert one or more move instructions in the optimized sequence of instructions to move one or more entries among the plurality of alias registers during execution, to expedite alias checking at execution time, wherein the edges of the graph include checking edges and anti-checking edges;

wherein a checking edge connects two nodes representing two memory instructions that require execution time memory aliasing checking, and an anti-checking edge connects two nodes representing two instructions that do not require execution time memory aliasing checking.

2. The non-transitory computer-readable medium of claim 1, wherein the computer-readable code is further to cause the computer system to, before the insert:

detect one or more cycles in the graph; and insert into the graph one or more additional nodes to remove the one or more cycles, the one or more additional nodes representing the one or more move instructions to be inserted into the optimized sequence of instructions.

3. The non-transitory computer-readable medium of claim 2, wherein detect one or more cycles in the graph and insert into the graph one or more additional nodes representing the one or more move instructions comprise:

identify in the graph for a memory instruction B of the optimized sequence of instructions, a set of nodes S reachable from a first node representing B through an incoming edge A→B from a second node A; and insert into the graph a third node representing a move instruction before the first node representing B, where second node A is found in S.

4. The non-transitory computer-readable medium of claim 2, wherein detect one or more cycles in the graph and insert into the graph one or more additional nodes representing the one or more move instructions comprise:

initialize an order number assignment $T(X)$ for each instruction X of the optimized sequence of instructions with the instruction X's relative placement $T(X)$ in the sequence of instructions prior to optimization.

5. The non-transitory computer-readable medium of claim 4, wherein detect one or more cycles in the graph and insert into the graph one or more additional nodes representing the one or more move instructions further comprise:

for each instruction B of the optimized sequence of instructions, in an execution order of the optimized sequence of instructions:
denote B as scanned;
for each incoming edge A → B:
if $T(A) < T(B)$:
do nothing;
else if A has not been scanned:
set $T(A) = T(B) - 1$;
else
find a set S of all instructions reachable from B through incoming edges from instructions that are already scanned.

6. The non-transitory computer-readable medium of claim 5, wherein old_T and delta are variables, and wherein the computer-readable code is further to cause the computer system to:

for each instruction B of the optimized sequence of instructions, in an execution order of the optimized sequence of instructions:
for each incoming edge A → B:
if A is not in S:
set old_T = $T(B)$;
set $T(B) = T(A) + 1$;
set delta = $T(B)$ – old_T;
for each instruction C in S:
$T(C) = T(C) + $ delta.

7. The non-transitory computer-readable medium of claim 5, wherein old_T and delta are variables, and wherein the computer-readable code is further to cause the computer system to:

--- for each instruction B of the optimized sequence of instructions, in an
    execution order of the optimized sequence of instructions:
    for each incoming edge A → B:
        if A is in S:
            insert a move instruction ("AMOV")
            before B;
            denote AMOV as scanned
            replace edge A→B with edge AMOV→B
            set T(AMOV) = T(B) − 1;
            set delta = T(A) − T(AMOV);
            for each edge C→A where C is not yet
            scanned:
                replace edge C→A with edge
                C→AMOV
                set T(C) = T(C) − delta;
            for each edge A→C where C is not
            scanned:
                replace edge A→C with edge
                AMOV→C.

---

8. The non-transitory computer-readable medium of claim 2, wherein the optimized sequence of instructions defines a loop, and wherein the computer-readable code is further to cause the computer system to insert into the optimized sequence of instructions a move instruction to move a memory address associated with a loop invariant instruction from a first alias register entry to a second alias register entry to ensure that memory associated with instructions of the optimized sequence contained within the loop will be memory alias checked against memory associated with the loop invariant instruction.

9. The non-transitory computer-readable medium of claim 8, wherein the computer-readable code is further to cause the computer system to insert into the optimized sequence of instructions a rotate instruction to release all alias register entries upon execution of an iteration of the loop.

10. The non-transitory computer-readable medium of claim 8, wherein the computer-readable code is further to cause the computer system to assign a weight to an edge of the graph, wherein the weight assigned to the edge relates to a distance between iterations of the loop that contain instructions represented by the nodes connected by the edge;
wherein insert into the graph one or more nodes representing the one or more move instructions to remove the one or more cycles comprises inserting rotations into the optimized sequence of instructions where a total weight assigned to edges of a detected cycle is positive.

11. The non-transitory computer-readable medium of claim 10, wherein the computer-readable code is further to cause the computer system to use a Floyd-Warshall algorithm to detect a cycle having edges with a negative total weight.

12. A system comprising:
a processor; and
a memory;
wherein the processor includes an execution module to:
    execute a memory instruction in an optimized sequence of instructions with reordered memory instructions, including inserting a memory address associated with the memory instruction into a first alias register of a plurality of alias registers of the processor to facilitate memory aliasing detection to be performed against the memory address after a later execution of another memory instruction in the optimized sequence of instructions;
    later execute a move instruction in the optimized sequence of instructions to move the memory address inserted into the first alias register to a second alias register of the plurality of alias registers; and
    still later execute one or more other memory instructions in the optimized sequence of instructions;
wherein the optimized sequence of instructions are generated by a compiler from an un-optimized sequence of instructions;
wherein the move instruction is inserted into the optimized sequence of instructions by the compiler to expedite execution time memory aliasing checking.

13. The system of claim 12, wherein the optimized sequence of instructions defines a loop, the execution module further to execute a move instruction at a beginning of each iteration of the loop to move a memory address associated with a loop invariant instruction between alias register entries to ensure that memory associated with instructions within the loop are memory alias checked against memory associated with the loop invariant instruction.

14. The system of claim 13, wherein the execution module is further to execute a rotate instruction to release all alias register entries upon execution of an iteration of the loop.

15. A non-transitory computer-readable medium having computer-readable code embodied therein, the computer-readable code to cause a computer system, in response to execution of the computer-readable code, to:
    receive or retrieve a sequence of instructions targeted for execution on an execution processor, wherein the execution processor includes a plurality of alias registers and circuitry to check entries in an alias register for memory aliasing;
    construct a graph, with the sequence of instructions represented as nodes of the graph and edges of the graph including checking edges and anti-checking edges, a checking edge connecting two nodes representing two memory instructions that require execution time memory aliasing checking and an anti-checking edge connecting two nodes representing two instructions that do not require execution time memory aliasing checking;
    detect one or more cycles in the graph;
    insert into the graph one or more additional nodes to remove the one or more cycles, the one or more additional nodes representing one or more move instructions to be inserted into the sequence of instructions.

16. The non-transitory computer-readable medium of claim 15, wherein detect one or more cycles in the graph and insert into the graph one or more additional nodes representing the one or more move instructions further include:
    identify in the graph for a memory instruction B of the sequence of instructions, a set of nodes S reachable from a first node representing B through an incoming edge A→B from a second node A; and
    insert into the graph a third node representing a move instruction before the first node representing B, where second node A is found in S.

17. The non-transitory computer-readable medium of claim 15, wherein detect one or more cycles in the graph and insert into the graph one or more additional nodes representing the one or more move instructions comprise:
    initialize an order number assignment T(X) for each instruction X of the optimized sequence of instructions with the instruction X's relative placement T(X) in the sequence of instructions prior to optimization.

18. The non-transitory computer-readable medium of claim 17, wherein detect one or more cycles in the graph and insert into the graph one or more additional nodes representing the one or more move instructions further comprise:

```
for each instruction B of the sequence of instructions, in an execution
    order of the sequence of instructions:
        denote B as scanned;
        for each incoming edge A → B:
            if T(A) < T(B):
                do nothing;
            else if A has not been scanned:
                set T(A) = T(B) − 1;
            else
                find a set S of all instructions reachable from B
                through incoming edges from instructions that are
                already scanned.
```

19. The non-transitory computer-readable medium of claim 18, wherein old_T and delta are variables, and wherein detect one or more cycles in the graph and insert into the graph one or more additional nodes representing the one or more move instructions further comprise:

```
for each instruction B of the sequence of instructions, in an execution
    order of the sequence of instructions:
        for each incoming edge A → B:
            if A is not in S:
                set old_T = T(B);
                set T(B) = T(A) + 1;
                set delta = T(B) − old_T;
                for each instruction C in S:
                    T(C) = T(C) + delta.
```

20. The non-transitory computer-readable medium of claim 18, wherein old_T and delta are variables, and wherein detect one or more cycles in the graph and insert into the graph one or more additional nodes representing the one or more move instructions further comprise:

```
for each instruction B of the sequence of instructions, in an execution
    order of the sequence of instructions:
        for each incoming edge A → B:
            if A is in S:
                insert a move instruction ("AMOV")
                    before B;
                denote AMOV as scanned
                replace edge A→B with edge AMOV→B
                set T(AMOV) = T(B) − 1;
                set delta = T(A) − T(AMOV);
                for each edge C→A where C is not yet
                    scanned:
                        replace edge C→A with edge
                            C→AMOV
                        set T(C) = T(C) − delta;
                for each edge A→C where C is not scanned:
                    replace edge A→C with edge
                        AMOV→C.
```

21. The non-transitory computer-readable medium of claim 15, wherein the sequence of instructions defines a loop, and the computer-readable code are further to cause the computer system, in response to execution of the code, to insert into the sequence of instructions a move instruction to move a memory address of memory associated with a loop invariant instruction from a first alias register entry to a second alias register entry to ensure that memory associated with instructions of the sequence contained within the loop will be memory alias checked against memory associated with the loop invariant instruction.

22. The non-transitory computer-readable medium of claim 21, wherein the computer-readable code are further to cause the computer system, in response to execution of the code, to insert into the sequence of instructions a rotate instruction to release all alias register entries upon execution of an iteration of the loop.

23. The non-transitory computer-readable medium of claim 21, wherein the computer-readable code are further to cause the computer system, in response to execution of the code, to assign a weight to an edge of the graph, wherein the weight assigned to the edge relates to a distance between iterations of the loop that contain instructions represented by the nodes connected by the edge;
wherein insert into the graph one or more nodes representing the one or more move instructions to remove the one or more cycles comprises insert rotations into the sequence of instructions where a total weight assigned to edges of a detected cycle is positive.

24. A system comprising:
a processor;
a memory; and
a camera;
wherein the processor includes an execution module to:
execute a memory instruction in an optimized sequence of instructions with reordered memory instructions referencing the memory, wherein the sequence of instructions are part of an application associated with operation of the camera or usage of data associated with the camera, and the execution includes insertion of a memory address associated with the memory instruction into a first alias register of an alias register queue associated with the processor to facilitate memory aliasing detection to be performed by the processor against the memory address after a later execution of another memory instruction in the optimized sequence of instructions;
later execute a move instruction in the optimized sequence of instructions to move the memory address from the first alias register to a second alias register of the alias register queue that is later in the queue than the first alias register; and
still later execute one or more other memory instructions in the optimized sequence of instructions;
wherein the optimized sequence of instructions are generated by a compiler from an un-optimized sequence of instructions;
wherein the move instruction is inserted into the optimized sequence of instructions by the compiler to expedite execution time memory aliasing checking.

25. The system of claim 24, wherein the optimized sequence of instructions defines a loop, and the execution module is further to execute a move instruction at a beginning of each iteration of the loop to move a memory address associated with a loop invariant instruction between alias register entries to ensure that memory associated with instructions within the loop are memory alias checked against memory associated with the loop invariant instruction.

* * * * *